STORAGE ADDRESSING

Filed Aug. 17, 1967 3 Sheets-Sheet 1

INVENTORS
FRANK J. CAMPANO
GREGG C. HIATT
WILLIAM MC GOVERN
BY Douglas R. McKechnie
ATTORNEY

FIG. 3

AUTOMATIC EXTENSION STORAGE ADDRESSING

| | ADDRESS BIT DESIGNATION: | 0 | 1 | 2 | 3 | 4 | 5 | 6 | 7 | 13 | 14 | 15 | 16 | 17 | 18 | 19 | 20 |
|---|---|---|---|---|---|---|---|---|---|---|---|---|---|---|---|---|---|
| | FUNCTIONAL ADDRESS (26): | | | | | | | | | 0 | 0 | 0 | 1 | 1 | 0 | 1 | 0 |
| | ADDRESS BUS NORMAL OUTPUT: | 0 | 0 | 0 | 0 | 0 | 0 | 0 | 0 | 0 | 0 | 0 | 1 | 1 | 0 | 1 | 0 |
| | INVERTED ADR BUS OUTPUT: | 1 | 1 | 1 | 1 | 1 | 1 | 1 | 1 | 1 | 1 | 1 | 0 | 0 | 1 | 0 | 1 |
| 64K STG (TOTAL) | ADDRESSABLE STG ADR | | | | | | | X | X | X | X | X | X | X | X | X | X |
| | EXTN STG ADR (229) | | | | | | 1 | 1 | 1 | 1 | 1 | 1 | 0 | 0 | 1 | 0 | 1 |
| | INVALID ADR (IGNORED) | X | X | X | X | X | X | | | | | | | | | | |
| 128K STG | ADDRESSABLE STG ADR | | | | | | X | X | X | X | X | X | X | X | X | X | X |
| | EXTN STG ADR (229) | | | | | 1 | 1 | 1 | 1 | 1 | 1 | 1 | 0 | 0 | 1 | 0 | 1 |
| | INVALID ADR (IGNORED) | X | X | X | X | X | | | | | | | | | | | |
| 256K STG (TOTAL) | ADDRESSABLE STG ADR | | | | | X | X | X | X | X | X | X | X | X | X | X | X |
| | EXTN STG ADR (229) | | | | 1 | 1 | 1 | 1 | 1 | 1 | 1 | 1 | 0 | 0 | 1 | 0 | 1 |
| | INVALID ADR (IGNORED) | X | X | X | X | | | | | | | | | | | | |

FIG. 4

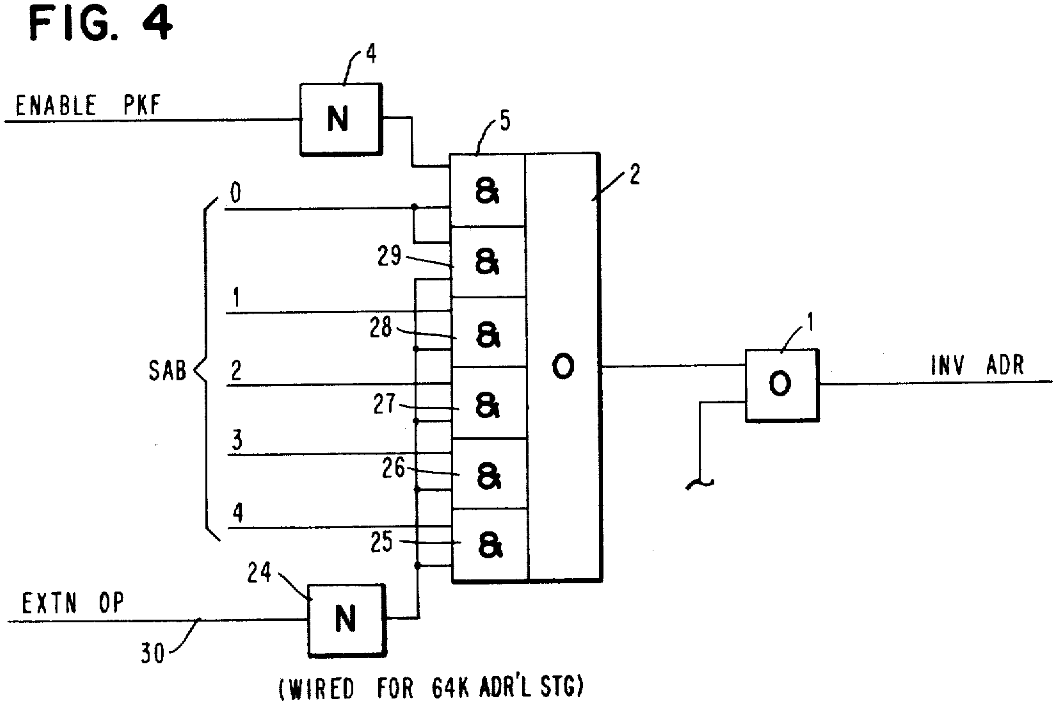

June 2, 1970 F. J. CAMPANO ET AL 3,516,070

STORAGE ADDRESSING

Filed Aug. 17, 1967 3 Sheets-Sheet 3

United States Patent Office
3,516,070
Patented June 2, 1970

3,516,070

STORAGE ADDRESSING

Frank J. Campano, Rumson, N.J., and Gregg C. Hiatt and William McGovern, Poughkeepsie, N.Y., assignors to International Business Machines Corporation, Armonk, N.Y., a corporation of New York Filed Aug. 17, 1967, Ser. No. 661,426
Int. Cl. G06f 9/20
U.S. Cl. 340—172.5 5 Claims

ABSTRACT OF THE DISCLOSURE

A data processing system has a storage divided into a low order addressable portion and a high order extension storage used, e.g., as working registers. The addressable portion is addressed in conventional manner. The extension storage is addressed by adding a functional address to the normal addressing data flow path and inverting or complementing all bits to form an address at the high order end of storage in the extension storage area.

This invention relates to data processing and, more particularly, to means for addressing a high order end of a storage device such as a main storage or an extension storage.

A data processing system normally has a main storage for storing data being processed, instructions for controlling the system, and information used in controlling the system. Such storage device has a series of unique storage locations, the majority of which are addressable by a programmer through a program. The remaining locations may have permanent storage assignments and such locations may or may not be addressable by the programmer. Some systems further have additional storage areas referred to as "bump" or extension storage that might be part of main storage. Extension storage is commonly used as working registers such as general purpose registers or floating point registers. It may also be used to store information such as unit control words for use in controlling I/O operations and it may be used for such functions as trap and simulate operations where the extension storage has sufficient capacity.

Both main storage and extension storage are known in the prior art. Both are thought of as having a range extending between a low order end and a high order end. In both types of storage, a particular location is normally addressed by specifying in the program or through some address generator the number assigned to the specific location, and signals corresponding to such number are processed through the system to access the particular location.

When systems of the above type have expandable storage, addressing difficulty may be encountered when additional storage is added to the system, especially when a storage area is used for some function that increases as the size of the system and storage increases. The difficulty may require reprogramming or adding hardware such as additional address generators. For example, in the prior art, extension storage has been addressed by generating full addresses in response to a related function. An improvement includes the use of relocation or indexing techniques wherein the basic address of an extension storage area is added to the address which relates to the particular function for which accessing of the extension storage is required. This provides a relatively simple way of reaching the extension storage. A device of this general type is disclosed in U.S. Pat. 3,262,100—Bespalko et al., entitled, "Data Processing Apparatus." However, in such systems, it is necessary to generate or emit or to derive, through table lookup apparatus, the base address that is to govern the relocation or indexing process. Additional hardware is thus required for this function and such hardware may cause a valuable loss of time. Additionally, if a computer using extension storage is to be provided with an expandable storage, then it is necessary to alter the circuits which generate or emit the base address accordingly.

The present invention relates to an addressing scheme which, although it can be used in a non-expandable system, is especially advantageous when used in a system having expandable storage. Thus, the principal object of the invention is to provide means for addressing an area of storage assigned to a particular function without regard to the size of store.

Another object of the invention is to provide an addressing scheme for use in a data processing system having expandable storage, wherein an area of such storage is assigned to a function which is expandable along with the system, and the addressing scheme maintains the same relative definition of such area or function relative to the system without requiring any hardware changes.

Another object is to provide a simple means for addressing the high order end of the main storage or an extension storage.

A further object is to provide means for addressing a storage area free from the requirement for a base address generator, emitter or table.

Still another object is to provide addressing schemes for use in a system wherein a functional address is specified, along with a functional control bit, and such address is converted to a storage address having a larger number of bits.

In accordance with the invention, the address for the functional area is generated by using a functional address that relates to the data flow or control logic function for which accessing of storage is required. The functional address has a number of bits less than that necessary to address a storage location and it is applied to the storage addressing data flow through, for example, an address register or an address bus, in such a manner that the entire address data flow is inverted. Such inversion is accomplished by forcing, for example, all ones into the high order positions greater than the number of bits in the functional address, and complementing the ones and zeros in the functional address. Thus, the storage address is generated by the simple means of complementing or inverting the functional address without a need for any base address. Furthermore, since the high order address bits are all ones, the size of the storage in the data processing system may be doubled, and again doubled, without the need for changing the storage address scheme since successive additional one bits are always available up to the maximum address capacity of the system.

An additional feature of the invention is that absolutely no change in the controls of the system is required when the system has an increase in addressable storage locations, the only requirements being those which are involved in changes relating to the basic addressable storage locations themselves.

The foregoing and other objects, features and advantages of the invention, will be apparent from the following more particular description of a preferred embodiment of the invention, as illustrated in the accompanying drawings.

In the drawings:

FIG. 3 is a chart illustrating the allocation of storage addresses, extension storage addresses, and invalid addresses in accordance with the automatic extension storage addressing of the present invention;

FIG. 4 is a simplified schematic block diagram of an invalid address detecting circuit for use in a data processing system incorporating the present invention.

The invention is illustrated as embodied in a system of the type disclosed in the copending application of the same assignee, entitled Large Scale Data Processing System, Ser. No. 609,238, filed Jan. 13, 1967 by Olin L. MacSorley et al., incorporated herein by reference. In said large scale data processing system, two storage devices are provided, each having 32,768 addressable storage locations divided into odd and even halves, each addressable storage location containing one 8-bit byte. For simplicity, storage capacities herein are rounded off such that the capacity of each storage device disclosed in said copending application will be referred to herein as having 32K (32,000) storage locations. Thus, the system of said copending application has a total of 64K storage locations.

Figure 1:
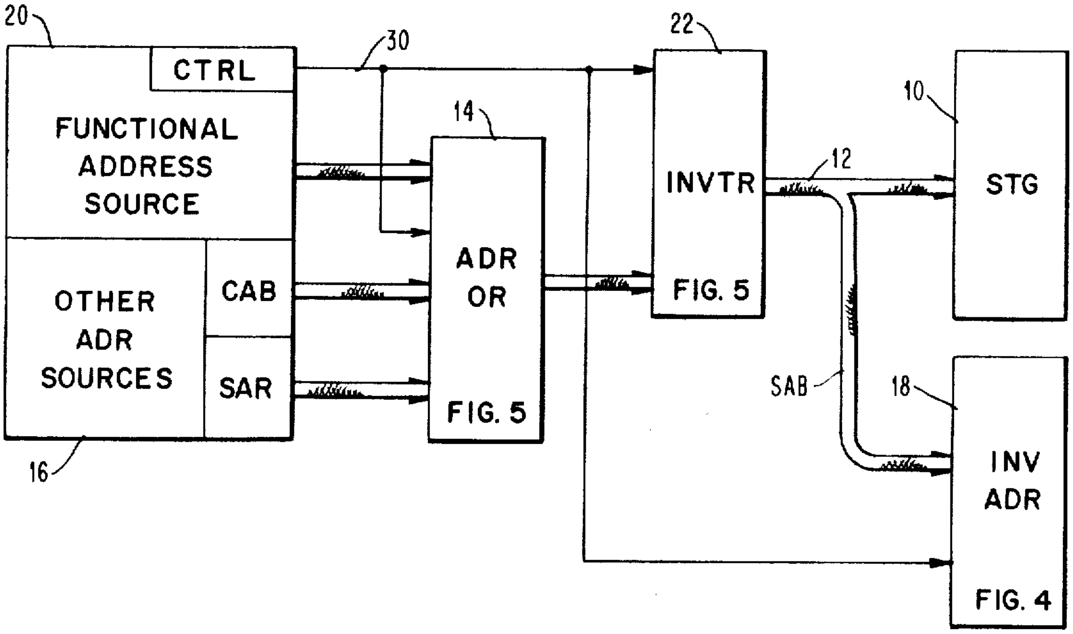
FIG. 1 is a simplified block diagram of a portion of a data processing system utilizing the automatic extension storage addressing of the present invention.

The simplicity of the present invention is apparent from the minor modifications required in order to incorporate it within the data processing system of said copending application. Specifically, referring to FIG. 1, the data processing system comprises storage 10 which is accessed by information on a storage address bus (SAB) 12 fed by an address OR circuit 14 from various sources of addresses 16 such as a channel address bus CAB or storage address register SAR. The availability of storage specified by the addresses on the storage address bus 12 is checked by an invalid address circuit 18. Such elements correspond to those shown in FIG. 10 of said application. Given that any data processing system includes functional addresses for its working registers, as illustrated by the functional address source 20, all that is required for incorporation of the present invention in such a system is to introduce the functional addresses into the address OR circuit 14, and controllably invert the output of the address OR circuit with an inverter 22 so as to apply the complement of the address OR output to SAB 12. Additionally, an address bit which might otherwise be an invalid address, for specifying a storage location outside the range of addressable storage locations, must be recognized as not being an invalid address whenever extension storage is being accessed. In all other respects, the data processing system of said copending application may remain unchanged in its general configuration.

Figure 2:
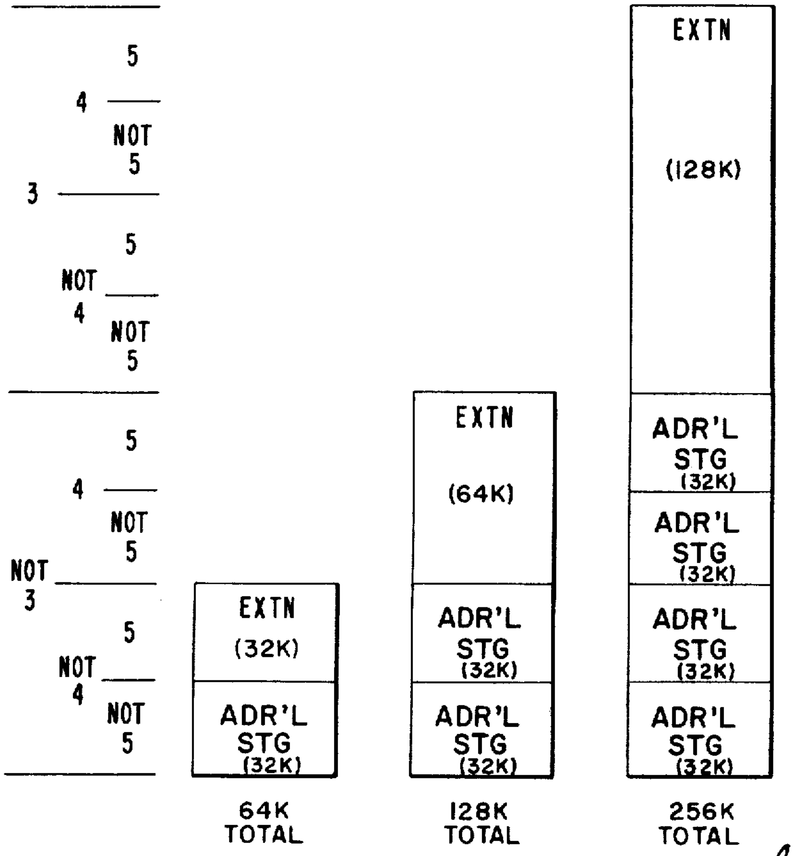
FIG. 2 is a diagrammatic illustration of the addressing concept in accordance with the present invention.

The concept of the present invention is illustrated more clearly with respect to FIG. 2. The address bits used in defining different areas of storage for different size storage systems are shown at the left side of FIG. 2 and are described in greater detail in connection with FIG. 3. Bit 5 relates to selection in the case of 32K addressable storage, bit 4 relates to selection in the case of 64K addressable storage, and bit 3 relates to selection in the case of 128K addressable storage, between the addressable storage and an equal-size extension storage. As seen in FIG. 2, conceptual addressing in accordance with the present invention places the extension storage at the high order end of a number of storage locations which equal the same amount of storage as in the addressable storage devices of the system. This is conceptual only, in that the physical location of the extension storage is immaterial to the present invention. In a 32K storage system, all of the addressable storage locations may be specified utilizing the first fifteen (6–20) of bits 6–23 (bits 21–23 are reserved for control purposes not relevant here) so that bit 5 may be used to indicate that a 32K extension storage is required. If the storage size is doubled so as to contain 64K addressable storage locations, bit 5 becomes part of the location address and is used to select between the first and second 32K groups of addressable storage. The presence of bit 4 specifies that a 64K extension storage is required. In a similar fashion doubling the total size of storage again to 256K storage devices conceptually places the extension storage at the high end addresses since all of the bits are ones except those bits which are the complement of the functional address. In such case, bit 3 specifies a 128K extension storage and bits 4 and 5 become a part of the location address. For each size storage, any bits of a higher order than the one used to get to extension storage, are ignored.

Generation of the addresses is illustrated in FIG. 3 wherein address bits are designated 0–23, bit 0 being the highest order bit and bit 20 being the lowest order bit shown. This mode of designating address bits is in conformity with FIG. 32 of said copending application of MacSorley et al. wherein 64K storage words are identified by sixteen bits 5–20, bit 5 indicating which of two 32K storage frames is addressed and bit 20 identifying whether the addressed word is stored in the odd or even half of that frame. FIG. 3 illustrates, as an example, addressing involving a functional address having a decimal value of "26." This address is set forth in row two of FIG. 3. The output of the address OR 14 (FIG. 1) is illustrated in FIG. 3 as the Address Bus Normal Output shown in row three. This as applied to the inverter 22 (FIG. 1) so as to be inverted to derive an address having all ones in the high order bits thereof, said address appearing in row four of FIG. 3.

Three examples are shown in FIG. 3 for the storage sizes illustrated in FIG. 2. Assuming a 64K (32K addressable storage) device, bits 6–20 are useful in reaching locations of the addressable storage apparatus as shown in row five. Bits 0–5 are therefore normally invalid addresses, as shown in row seven. In order to reach extension storage, bits 5–20 are utilized, bits 6–20 being expressive of the location address, and bit 5 designating that the location to be accessed is within extension storage, as shown in row six. Of course, as illustrated in row four, bits 0–4 are also available, but since these are not needed to define extension storage, they may be ignored.

Assuming the storage configuration to be doubled to 128K (illustrated on row eight), bits 5–20 are now needed to distinguish between all of the 64K addressable storage locations. Bits 0–4 are invalid addresses when normal storage addressing is involved, as shown on row ten. However, bit 4 is utilized now to specify extension storage, and bits 0–3 are ignored (row nine). A similar situation is shown for 256K in rows eleven through thirteen.

In order to discern between valid and invalid addresses, an invalid address circuit 18 (which is adapted from FIG. 34 of said copending MacSorley application) employs an additional inverter 24 and a plurality of AND circuits 25–29, in addition to the circuitry 1, 2, 4 and 5 used in said copending application. The presence of any one of the address bits 0–4 on corresponding lines of SAB 12 will normally indicate an invalid address. However, if an extension storage operation is indicated by an EXTN OP signal on a line 30, then each of the AND circuits 25–29 will be blocked by the output of inverter 24 so as not to recognize the presence of signals on these storage address bus lines as being invalid. This operates in the same fashion as does the panel key fetch inverter 4 for an AND circuit 5 with respect to bit 0 of the address bus since bit 0 is utilized (as described completely in said copending MacSorley et al. application) to designate the fetching of data from panel keys on a console rather than from a storage device. The apparatus of FIG. 4 is illustrated as wired for a 64K storage arrangement.

Figure 5:
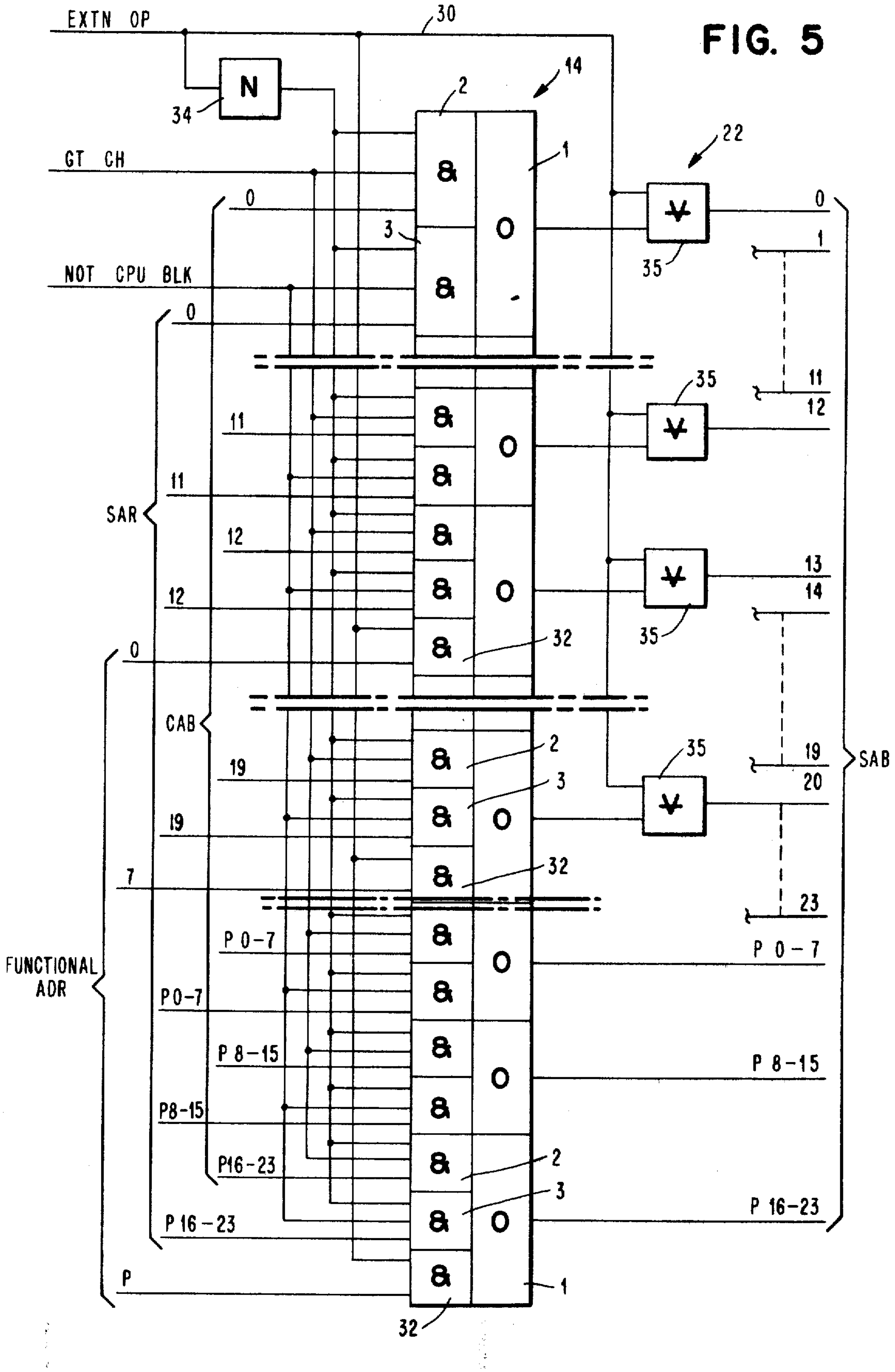
FIG. 5 is a simplified schematic block diagram of an address bus incorporating inverting means in accordance with one embodiment of the present invention.

FIG. 5 shows how the circuit shown in FIG. 31 of said application may be modified to form address OR circuit 14 the purpose of which is to selectively provide SAB 12 with an address designation originating from either functional address source 20 or from SAR or CAB of sources 16. In a manner similar to said application, circuit 14 has a series of OR circuits 1 for address bits 0–23 and parity bits P 0–7, P 8–15 and P 16–23, each operated by AND circuits 2 and 3 in dependence on whether a channel or a CPU operation is involved. AND circuits 2 are conditioned by a signal on GT CH line, by signals from CAB and by the absence of blocking output signal from inverter 34, caused by an EXTN OP signal on line 30, so as to feed address designations to SAB 12 from CAB. AND circuits 3 are conditioned by a signal on NOT CPU BLK line, by signals from SAR and by the absence of a blocking output signal from inverter 34, caused by an EXTN OP signal on line 30, so as to feed address designations from SAR to SAB 12 via inverter 22.

For purposes of illustration, the functional address source supplies nine bits comprising an eight bit address and a parity bit. These bits are designated 0–7 and P in FIG. 5. Bits 0–7 are applied to the low order end of the data flow path in bits positions 13–20. Thus, a series of AND circuits 32 are connected to the inputs of OR circuits 1 in bit positions 13–20. AND circuits 32 are conditioned by an EXTN OP signal on line 30 and by signals from functional address source 20 to provide a functional address output from circuits 1 in a manner described more fully below.

The outputs of circuits 1 are fed to the inputs of a series of EXCLUSIVE OR circuits 35 having other inputs connected to line 30. During extension storage operations, an EXTN OP signal appears on line 30 in conjunction with function address signals on lines 0–7 and the EXTN OP signal does four things. It blocks AND circuits 2 and 3 so that the outputs from circuits 1 represent zeros for the high order bits 0–12. It represents one bits which are applied to circuits 35 so that the outputs therefrom representing high order bits 0–12 are all ones. It conditions AND circuits 32 so that the outputs of OR circuits 1, on bits 13–20, represent the functional address. It represents one bits which are applied to circuits 35 so that the outputs therefrom representing low order bits 13–20, are combined with the functional address to form the one's complement thereof. Thus, during extension storage operations, the EXTN OP signal causes circuits 35 to invert the signals appearing on the outputs of circuits 1. Note that no exclusive OR circuits 35 are provided for the partity bits since even bit addresses remain even and odd bit addresses remain odd.

An alternative embodiment of the present invention would apply the functional address to the storage address register illustrated in FIG. 23 of said MacSorley et al. application, and invert the output thereof as illustrated with respect to FIG. 5 herein. This would permit the CPU to reach high order address locations within the regular addressable storage devices provided in the system of said copending MacSorley et al. application. The blocking of invalid address bits as illustrated in FIG. 4 herein would be provided, but no other change in the system would be required in order to permit this form of addressing.

A similar embodiment would incorporate the application within a channel device of some functional address, such as the address of an input/output unit which requires accessing of a unit command word, the unit command word being stored in extension storage at an address which relates to the unit address designation. Thus, the address bits could appear in the bus control unit of said copending MacSorley et al. application at the channel address bus input thereto.

Instead of utilizing the storage address bus as the point of introducing the functional addresses, and complementing the storage address bus so as to define an address for extension storage as disclosed hereinbefore, an alternative embodiment may be provided, as relates to FIGS. 23 and 27 of said aforementioned MacSorley et al. application. The functional addresses could be applied to the storage address register (SAR) shown in FIG. 23 of said copending application to MacSorley et al. The addresses could be introduced either through the address adder or the incrementer, or by providing an additional input to SAR (as generally illustrated in FIG. 5 herein). The output of SAR could be inverted as illustrated herein in FIG. 5, or in any other suitable way. The utilization of the addresses supplied from the storage address register and the CPU (SAR) could include selecting extension storage instead of either the EVEN or the ODD halves of one of the four other storage devices, as illustrated in FIG. 22 of said copending application. Thus the output of FIG. 22 of said copending application could include an additional line which may be entitled "CPU SEL EXTN," this could be utilized in FIG. 27 of said copending application to set a fifth latch equivalent to the latches 1–4 in FIG. 27 so as to permit reaching extension storage instead of one of the other storage devices. A similar relationship could exist with respect to provision of extension storage for accessing by the channels, in which case the fifth latch would have a pair of inputs thereto, one relating to CPU selection of extension and the other relating to channel selection of the extension. Thus, the present invention may be employed in a variety of ways to suit the expediency of any given system being designed.

It is not described herein how the functional address is to be generated; the functional address could come, however, from such indications as the general purpose register designations found in an instruction in the data processing system having an architecture of the type disclosed in said copending MacSorley et al. application. Similarly, the program status word register could be reached by designating an extension storage address in accordance with the present invention for allocation to program status word operations.

The address itself may be generated by applying it to some point of an address bus and inverting the entire channel address bus in a manner similar to that described with reference to FIG. 5 herein. Alternatively, the address could be introduced at the input of a negative logic gate, as illustrated in FIG. 12 of a copending application of the same assignee entitled Integrated Data Processing Apparatus, Ser. No. 582,766 filed on Sept. 28, 1966 by William McGovern et al. and incorporated herein by reference. By not gating the high order bits, they automatically become all ONE's; by gating the low order bits and applying the "true" form of functional address bits, they become inverted.

Such usage of CPU or channel accessing of extension storage in accordance with the present invention may be employed in a device in which certain of the normally addressable storage locations (e.g., within the 64K configuration described in said MacSorley et al. application) are designated for extension storage use, or in a system where a separate extension storage area is provided. Which of these storage configurations is utilized with the present invention is immaterial, as described hereinbefore.

While the invention has been shown and described with respect to preferred embodiments thereof, it should be obvious to those skilled in the art that the foregoing and other changes and omissions as in the form and detail thereof may be made therein without departing from the spirit and the scope of the invention, which is to be limited only as set forth in the following claims.

What is claimed is:

1. The method of addressing a multi-location electronic data processing system main storage having low order locations and high order locations by sending signals representing addresses along a storage addressing data flow path having a width at least as great as the number of bits necessary to designate all locations, comprising the steps of:

addressing said low order locations by introducing signals representing an address in true form into said storage addressing data flow path;

addressing said high order locations by introducing signals representing a functional address into said storage addressing data flow path in the lowest order bits thereof, said functional address having a number of bits less than the number of addressing data flow bits;

forming signals representing the one's complement of said functional address; and adding, in conjunction with said last step, signals, representing a series of ones to the high order end of said storage address data flow path, to thus form the address of a high order location.

2. The method of extending by one area the number of accessible locations, in a two area storage of a digital electronic data processing system, that may be designated by a functional address portion of a plural bit address flow, which functional address is sufficient to designate storage locations in a first area of storage, comprising the steps of:

introducing digital signals to the storage by an address flow having a number of bits equal to or greater than the number necessary to designate all locations in both areas of the storage;

introducing into the address flow digital signals representing a functional address having a number of bits necessary to designate all locations in the first area of the storage;

inverting the digital signals representing the bits in said address flow; and applying said inverted digital signals to said storage access the locations, thus designated, in the second area of storage.

3. A data processing system having a storage apparatus including a given number of addressable locations in first and second sections of the storage, said given number of addressable locations being distinctly designatable by a plural order address manifestation, the number of orders being a function of the number of addressable locations; address data flow means for transferring to said storage apparatus a multiple order address designation; and means for selecting a particular storage operation, wherein the improvement comprises:

means responsive to said selecting means for introducing a functional address designating a location in the first section of the storage, into the low order end of said address data flow means; and means responsive to said selecting means for complementing the value of each order of said address data flow means to designate a location in the second section of the storage.

4. The invention of claim 3 wherein said address data flow means has more orders than are necessary to designate all addressable locations.

5. A data processing system having a main storage comprising a multiplicity of addressable storage locations ranging from a low order end to a high order end, a bus connected to apply addresses to said storage, a first source of addresses each having a number of bits sufficient to access any storage location, and a second source of addresses each having a number of bits sufficient to access a limited number of storage locations, wherein the improvement comprises:

means connecting said first and second sources to said bus;

gating means switchable between first and second conditions, said gating means being operative when in said first condition to gate addresses from said first source onto said bus in true form, said gating means being operative when in said second condition to gate addresses from said second source onto said bus in complement form; and means operative when said gating means is in said second condition to place a series of like signals on said bus, in addition to complemented addresses from said second source, so as to access the high order end of said storage.

References Cited

UNITED STATES PATENTS

| | | | |
|---|---|---|---|
| 3,303,477 | 2/1967 | Voigt | 340—172.5 |
| 3,234,519 | 2/1966 | Schalten | 340—172.5 |
| 3,230,513 | 1/1966 | Lewis | 340—172.5 |
| 3,292,151 | 12/1966 | Barnes et al. | 340—172.5 |
| 3,425,039 | 1/1969 | Bahrs et al. | 340—172.5 |

GARETH D. SHAW, Primary Examiner